US012774743B2

(12) United States Patent
Gsenger et al.

(10) Patent No.: US 12,774,743 B2
(45) Date of Patent: Oct. 27, 2026

(54) ELECTRIC TRACTION DRIVE HAVING AN ACTIVE AND A PASSIVE COOLANT/LUBRICANT CIRCUIT, AND METHOD FOR OPERATING THE TRACTION DRIVE

(71) Applicant: MAGNA Powertrain GmbH & Co KG, Lannach (AT)

(72) Inventors: Christoph Gsenger, Graz (AT); Wolfgang Schweiger, St. Stefan (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 16 days.

(21) Appl. No.: 18/957,946

(22) Filed: Nov. 25, 2024

(65) Prior Publication Data

US 2025/0180108 A1 Jun. 5, 2025

(30) Foreign Application Priority Data

Dec. 5, 2023 (DE) ..................... 10 2023 212 248.0

(51) Int. Cl.

| | |
|---|---|
| ***F16H 57/04*** | (2010.01) |
| ***B60K 11/02*** | (2006.01) |
| ***H02K 7/116*** | (2006.01) |
| ***H02K 9/193*** | (2006.01) |

(52) U.S. Cl.

CPC .......... *F16H 57/0476* (2013.01); *B60K 11/02* (2013.01); *F16H 57/0412* (2013.01); *F16H 57/0435* (2013.01); *F16H 57/0436* (2013.01); *F16H 57/045* (2013.01); *H02K 7/116* (2013.01); *H02K 9/193* (2013.01)

(58) Field of Classification Search

CPC ............. F16H 57/0457; F16H 57/0442; F16H 57/045; F16H 57/0476

See application file for complete search history.

(56) References Cited

U.S. PATENT DOCUMENTS 3,529,698 A * 9/1970 Nelson ................ F16H 57/0447 184/6.12
8,746,405 B2 * 6/2014 Perakes .............. F16H 57/0409 184/6.12

(Continued)

FOREIGN PATENT DOCUMENTS

DE 19856941 C1 2/2000
DE 102017101826 A1 8/2018

(Continued)

*Primary Examiner* — Michael A Riegelman
(74) *Attorney, Agent, or Firm* — Dickinson Wright PLLC

(57) ABSTRACT

An electric traction system having an electric machine, a transmission and a common cooling lubricant circuit, wherein an oil sump and at least one oil reservoir are installed. The oil reservoir can be filled both by means of an electric oil pump (1) and by means of oil spray from components of the transmission, wherein the oil reservoir acts as a pressure tank or high tank. The oil pump is connected directly to cooling/lubricating oil points under pressure, and the at least one outlet of the oil reservoir is connected to further cooling/lubricating oil points, wherein the further cooling/lubricating oil points are pressurized either also with the pressure of the oil pump or with the geodetic pressure of the oil reservoir.

7 Claims, 14 Drawing Sheets

(56) References Cited

U.S. PATENT DOCUMENTS

| | | | | |
|---|---|---|---|---|
| 8,899,381 | B2 * | 12/2014 | Ebihara | F16H 57/0423 184/6.12 |
| 9,772,027 | B2 * | 9/2017 | Preston | F16H 57/0409 |
| 10,309,520 | B2 * | 6/2019 | Boerema | F16H 7/18 |
| 10,746,282 | B2 * | 8/2020 | Ito | F16H 57/0471 |
| 10,859,152 | B2 * | 12/2020 | Yu | F16H 57/0475 |
| 11,906,033 | B2 * | 2/2024 | Houser | F16H 57/0424 |
| 12,055,210 | B2 * | 8/2024 | Hirata | F16H 57/0423 |
| 12,215,774 | B2 * | 2/2025 | Stefani | F16H 57/0424 |
| 12,234,905 | B2 * | 2/2025 | Yamamoto | F16H 57/029 |
| 2015/0345616 | A1 * | 12/2015 | Schweiher | F16H 57/045 184/6.12 |
| 2019/0181720 | A1 * | 6/2019 | Yamaguchi | H02K 5/04 |
| 2020/0271194 | A1 * | 8/2020 | Takahashi | F16H 57/037 |
| 2020/0340574 | A1 * | 10/2020 | Sbabo | F01D 25/20 |
| 2022/0042591 | A1 * | 2/2022 | Yu | F16H 57/0471 |
| 2025/0180108 | A1 * | 6/2025 | Gsenger | F16H 57/0442 |

FOREIGN PATENT DOCUMENTS

| | | | | |
|---|---|---|---|---|
| DE | 102022202272 | A1 | 9/2022 | |
| DE | 102022112058 | A1 * | 11/2023 | F16H 57/0424 |
| JP | 2009250415 | A | 10/2009 | |
| WO | 2021005186 | A1 | 1/2021 | |

* cited by examiner

Schnitt A - A

ELECTRIC TRACTION DRIVE HAVING AN ACTIVE AND A PASSIVE COOLANT/LUBRICANT CIRCUIT, AND METHOD FOR OPERATING THE TRACTION DRIVE

CROSS-REFERENCE TO RELATED APPLICATIONS

This application claims priority of the German Application No. DE 10 2023 212 248.0 filed on Dec. 5, 2023. The entire disclosure of the above application is incorporated herein by reference.

FIELD OF THE INVENTION

The invention relates to an electric traction drive having an active and a passive cooling/lubricant circuit.

The invention also relates to a method for operating the traction drive.

BACKGROUND OF THE INVENTION

In high-performance electric drives having a high power density, use is made of partially or entirely oil-cooled electric machines. Here, the rotor shaft and/or the stator of the electric machine is cooled using oil. In the case of entirely oil-cooled electric machines, the cooling oil demand of the rotor shaft and of the stator varies depending on the current operating point, in particular owing to the copper losses, iron losses and electromagnetic losses that occur in the machine. Therefore, for the greatest possible thermal availability, and in order to minimize power losses, it is necessary for the partial volume flows to be distributed between the rotor shaft and to the stator in accordance with demand. In conventional electric traction drives that are equipped with an electrically operated oil pump, the delivered volume flow provided by the displacement pump—normally designed as a toothed-ring or gerotor pump—is generally utilized exclusively to cool temperature-critical active components, such as the stator and/or rotor of the electric drive machine, in accordance with demand. For this purpose, the electrically operated oil pump is activated and deactivated, and/or controlled in terms of its rotational speed, in accordance with demand.

Known solutions use passive, pressure-controlled or temperature-controlled valves, as described in DE 10 2017 101 826 A1. Use can also be made of active electrically controllable switching or proportional valves, but this is normally avoided for cost reasons.

The transmission components are generally cooled and lubricated passively, for which purpose the delivery action of a differential spur gear or of a countershaft spur gear is utilized in combination with a suitable housing that acts as an oil-guiding device. This is associated with a limited delivery action, which is dependent on the vehicle speed and the toothed gear rotational speed, and accompanying hydrodynamic losses, which are highly dependent on the rotational speed and on the oil temperature. In the case of passive lubrication of the transmission components such as toothed gears, rolling bearings and radial shaft sealing rings, churning losses occur.

WO 2021/005 186 A1 presents a transmission. Aside from the toothed gears of the transmission, the transmission has a multi-chamber system. The multi-chamber system is situated in the vicinity of individual toothed gears of the transmission. The multi-chamber system is located adjacent to a toothed-gear stage, in the immediate vicinity of the toothed-gear stage, in order to retain lubricant or transmission oil in the vicinity of the transmission stage. The reservoir formed by the multi-chamber system is situated physically close to at least one transmission stage. During the operation of the transmission, the multi-chamber system stores a certain quantity of lubricant, and releases this quantity back into (re)circulation only after a certain period of time. The rotation of the toothed gears can be used for separation of the lubricant under the action of a centrifugal force. The separated lubricant passes at least in part into the multi-chamber system, into a first receiving chamber, which is for example a reservoir chamber.

A recirculation path leads from chamber to chamber. However, no active lubrication of the drivetrain or of the transmission by means of an oil pump is provided.

JP 2009-250 415 A has disclosed a cooling mechanism which is capable, if the rotational speed of a rotary element is low, of increasing the quantity of a cooling liquid fed to a part to be cooled. The cooling mechanism comprises a pump which is driven by a force transmitted via the rotary element and which draws in the cooling liquid and discharges it into a cooling liquid pocket; and the parts to be cooled, to which the cooling liquid discharged by the pump is fed, comprises a tank, which forms a passage for feeding the cooling liquid, which is moved upward by the rotation of the rotary element, to the to be cooled, a passage for feeding the cooling liquid discharged by the pump, and the cooling liquid moved upward by the rotary element, to the parts to be cooled, and retains the cooling liquid.

US 2020/0 271 194 A1 describes a vehicle drive device comprising a rotating electric machine, a force-transmitting mechanism that transmits a rotational drive force between the rotating electric machine and a plurality of wheels, a housing that accommodates at least a part of the force-transmitting mechanism and of the rotating electric machine, and a hydraulic pump.

In DE 10 2022 202 272 A1, a transmission mechanism device comprises a motor, a transmission mechanism having a plurality of toothed gears, a first shaft and a bearing which supports the first shaft and which transmits the power of the motor, a housing which accommodates the transmission mechanism and which holds the bearing at an inner side, oil which collects in a lower region in the interior of the housing, a collecting container which is arranged in the interior of the housing and which is upwardly open, an oil passage through which the oil flows, and an oil pump which is provided in the oil passage. The oil passage has a first path, which connects the oil pump and the collecting container, and a scooping path for scooping the oil as a result of rotation of the toothed gear, in order to guide the scooped oil to the collecting container. The collecting container has a feed portion for supplying oil to the transmission and bearing.

SUMMARY OF THE INVENTION

It is an object of the invention to create a combined active and passive cooling lubricant circuit for an electric traction drive, and a corresponding method for oil pump operation, whereby, depending on the vehicle operating mode, the efficiency and/or thermal availability of the electric traction drive is optimized and, at the same time, a fail-safe lubrication system is ensured.

The object is achieved by means of an electric traction system having an electric machine, a transmission and a common cooling lubricant circuit, wherein an oil sump and at least one oil reservoir are installed. The oil reservoir can be filled both by means of an electric oil pump and by means of oil spray from components of the transmission, wherein the oil reservoir acts as a pressure tank or high tank. The oil pump is connected directly to cooling/lubricating oil points under pressure, and the at least one outlet of the oil reservoir is connected to further cooling/lubricating oil points, wherein the further cooling/lubricating oil points are pressurized either also with the pressure of the oil pump or with the geodetic pressure of the oil reservoir.

The combination of active and passive transmission lubrication makes it possible, in conjunction with an operating strategy which is optimized with regard to efficiency and/or thermal availability, to reduce churning losses in the transmission, and increase the thermal availability of the system, during active pump operation.

In one advantageous embodiment, the oil reservoir is comprised of individual chambers which are separated from one another by partitions of different height.

It is advantageous that the oil reservoir can be filled by the oil pump via a single valve.

The valve may be designed as a 2/2 directional valve and is a hydraulic shuttle valve having a valve ball as a sealing element or is a flap valve.

Cost-effective implementation is thus possible because, aside from a single flap valve, no additional components are required.

A simple construction is possible by virtue of the flap valve being installed in the oil reservoir, wherein the oil reservoir consists of two housing parts which, when connected together, serve as a bearing for a bearing journal of the valve flap of the flap valve.

In one embodiment, the valve flap is formed together with the bearing journal as a single-piece component which has a sealing surface and a connection, via a narrowed portion, to the bearing journal.

The object is likewise achieved by means of a method for operating an electric traction system having an electric machine, a transmission and a common cooling lubricant circuit, wherein, in operating states in which active cooling of the electric machine is advantageous or required for thermal reasons, the active cooling and lubricating circuit is maintained by means of the electrically operated oil pump, and in operating states in which active operation of the electric oil pump is not required or is not imperatively required for thermal reasons, and in the event of a failure of the electric oil pump, a passive cooling/lubricating circuit is automatically activated.

The method is carried out such that a slight preload pressure is set in the oil reservoir in accordance with the oil pump rotational speed and the oil temperature.

By means of the oil pump operating strategy, a selection is made between active or passive provision of the transmission cooling and lubricating oil flow in accordance with the present driving state. Furthermore, owing to the fact that the passive cooling and lubrication circuit is automatically activated when the oil pump is inactive, fail-safety of the transmission lubrication is ensured.

The combination of active dry sump lubrication with full passive oil spray lubrication leads, in conjunction with a suitable operating strategy of the electric oil pump, to an increase in the energy efficiency on a whole-system level, to an increase in thermal availability and performance of the drive system, to a fail-safe lubrication concept because the passive cooling and lubrication circuit is automatically activated when the electric oil pump is in active, and to the possibility of implementing new functions such as active preconditioning/follow-on cooling at a standstill.

DRAWINGS

The drawings described herein are for illustrative purposes only of selected embodiments and not all possible implementations and are not intended to limit the scope of the present disclosure.

FIG. 1 is a schematic illustration of a combined active and passive cooling lubricant circuit according to the invention for an electric traction drive, FIG. 2 is a schematic illustration of the cooling and lubrication circuit according to FIG. 1 when an oil pump is active, FIG. 3 is a schematic illustration of the cooling and lubrication circuit according to FIG. 1 when the oil pump is inactive, FIG. 4 is a schematic illustration of the cooling and lubrication circuit according to the invention having a multi-chamber fluid reservoir with an integrated flap valve in a first operating state, FIG. 5 is a schematic illustration of the cooling and lubrication circuit according to the invention having the multi-chamber fluid reservoir with the integrated flap valve in a second operating state, FIG. 6 is a sectional illustration through the multi-chamber fluid reservoir according to FIG. 5, FIG. 7 is a sectional illustration of an exemplary embodiment of a fluid reservoir with integrated flap valve according to FIGS. 4 to 6, FIG. 8 shows, by way of example, a flow diagram of a possible operating strategy for the operation of the cooling lubricant circuit according to the invention, and FIGS. 9 to 15 show an embodiment of a cooling and lubrication circuit using a flap valve.

DESCRIPTION OF THE INVENTION

FIG. 5 assumes the presence of a drive having an electric machine, of which a rotor shaft toothed gear 14 is illustrated in the sectional image. No further components of the electric machine, such as the stator, are illustrated. The rotor shaft toothed gear 14 meshes with a countershaft toothed gear 13, which is surrounded by a housing 16. The countershaft toothed gear 13 meshes in turn with a differential spur gear 12, which rotates in a housing 15. The two housings are connected to an oil sump 8 and an oil reservoir 2, which are situated geodetically above all of the axes of rotation of the aforementioned shafts.

FIG. 1 shows a cooling lubricant circuit which, by means of an electrically driven pump 19, feeds cooling oil in the direction of active cooling/lubricating oil points 7'. A connection which is parallel to the connections of the active cooling/lubricating oil points 7' is connected to a valve 5, which is installed at the inlet of an oil reservoir 2 close to the upper boundary of the oil reservoir. Oil spray 11 from the rotating toothed gears of a transmission having a differential passes in the direction of the circular arrow, and is collected by an oil-guiding device 10 and an oil-collecting channel 4 and guided into the oil reservoir 2. Situated on the underside of the oil reservoir 2 is at least one outlet 6 which supplies cooling/lubricating oil to the passive cooling/lubricating oil points 7. The oil reservoir 2 has a geodetic height $h_{max}$.

The oil reservoir 2, which is arranged at an appropriate position in the transmission, acts as a pressure tank 2' or as a high tank 2" depending on the operating state of the electrically operated oil pump.

FIG. 2 is a schematic illustration of the cooling and lubricating circuit according to FIG. 1 when the oil pump 19 is active. Via the valve 5, the reservoir 2, as pressure tank 2', is filled with cooling/lubricating oil. The pressure p1 generated by the oil pump is then available, at the outlet 6, for the cooling/lubricating oil points 7. The active filling with a slight preload pressure, for example in the region of 20 mbar, allows cooling/lubrication even when oil spray is not available.

FIG. 3 is a schematic illustration of the cooling and lubricating circuit according to FIG. 1 when the oil pump 19 is inactive but the transmission is active and conveys oil spray 11 in the direction of the reservoir. Passive, unpressurized filling takes place in this situation.

Depending on the vehicle operating mode, the most efficient state for the present operating mode can always be selected by means of a corresponding operating strategy of the electric oil pump.

If the oil pump 19 is active, the oil reservoir 2 is actively filled by way of the overall conveyed volume flow or by way of a partial volume flow which is provided from the electrically driven oil pump 19, for example by the control of hydraulic resistance using apertures. In this operating state, the pressure-side oil lines consisting of oil bores, rotor lance etc. and the oil reservoir 2 are completely filled with oil, whereby a lowering of the oil sump level in the oil sump 8 is automatically achieved, and unnecessary churning by the toothed gears is consequently prevented.

If the oil pump 19 is inactive, the oil reservoir 2 is passively filled by means of at least one of the spur gears used as oil-conveying toothed gears, the differential spur gear 12, and the countershaft spur gear 13, by way of centrifuged oil spray 11. In this operating state, the pressure-side lines such as oil bores, rotor lance etc. run dry (p=0), whereby the oil sump level in the oil sump 8 is automatically increased, and the passive delivery action is consequently achieved by virtue of the differential spur gear 12 dipping into the oil sump. The pressure p provided at the outlet of the oil reservoir is calculated from density*gravitational acceleration*height h and is a geodetic pressure. A geodetic pressure describes the pressure at the lower end of the fluid column, which arises owing to the inherent weight of the fluid.

A change between active operation with dry sump lubrication or forced-feed lubrication and passive operation with oil spray lubrication is performed automatically by way of a flap valve 5*a* which is integrated in the oil reservoir 2 and which is designed as a 2/2 directional valve. Depending on the operating state of the electric oil pump 19, the connection of a pressure line of the oil pump 19 to the oil reservoir 2 and the connection of an inlet opening of the oil reservoir 2 to the oil reservoir 2 is closed or opened up.

FIG. 4 is a schematic illustration of the cooling and lubricating circuit 1 according to the invention having an oil reservoir 2 that is divided up into a plurality of chambers 20*a*, 20*b*, 20*c*. The flap valve 5*a* integrated in the oil reservoir is situated in a first operating state, and allows the reservoir to be filled up to the maximum fill level $h_{max}$ in all three of the chambers 20*a*, 20*b* and 20*c*, which have different structural heights h1, h2 and h3. The chambers are separated from one another by partitions.

FIG. 5 is a schematic illustration of the cooling and lubricating circuit 1 according to the invention in a second operating state, in which the fill levels in the various chambers 20*a*, 20*b* and 20*c* are each of different height.

By virtue of the oil reservoir 2 being designed as a multi-chamber system, it is possible, when the electric oil pump 19 is inactive or if it has failed, for critical cooling/lubricating points in the transmission to be targetedly supplied with cooling/lubricating oil in accordance with, or independently of, the vehicle speed or the gear set rotational speed. For this purpose, for each component to which cooling lubricant is to be supplied, or for a group of components to which cooling lubricant is to be supplied, associated chambers 20*a*, 20*b*, 20*c* in the oil reservoir 2 are defined. Structural parameters for the adjustment of the partial volume flows to the components to which cooling lubricant is to be supplied are not only the geodetic height of the chamber inlet region but also the chamber volume and the geodetic heights h1, h2, h3 and the cross section of the outlet openings 6.

Figure 1:
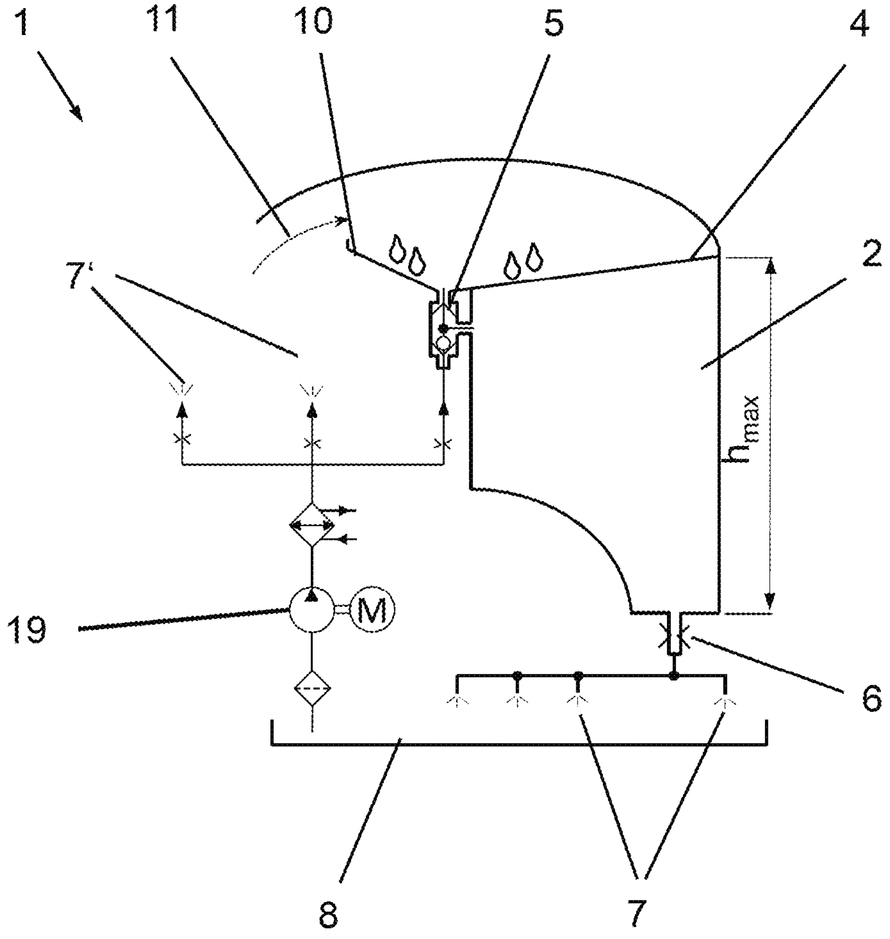
Figure 2:
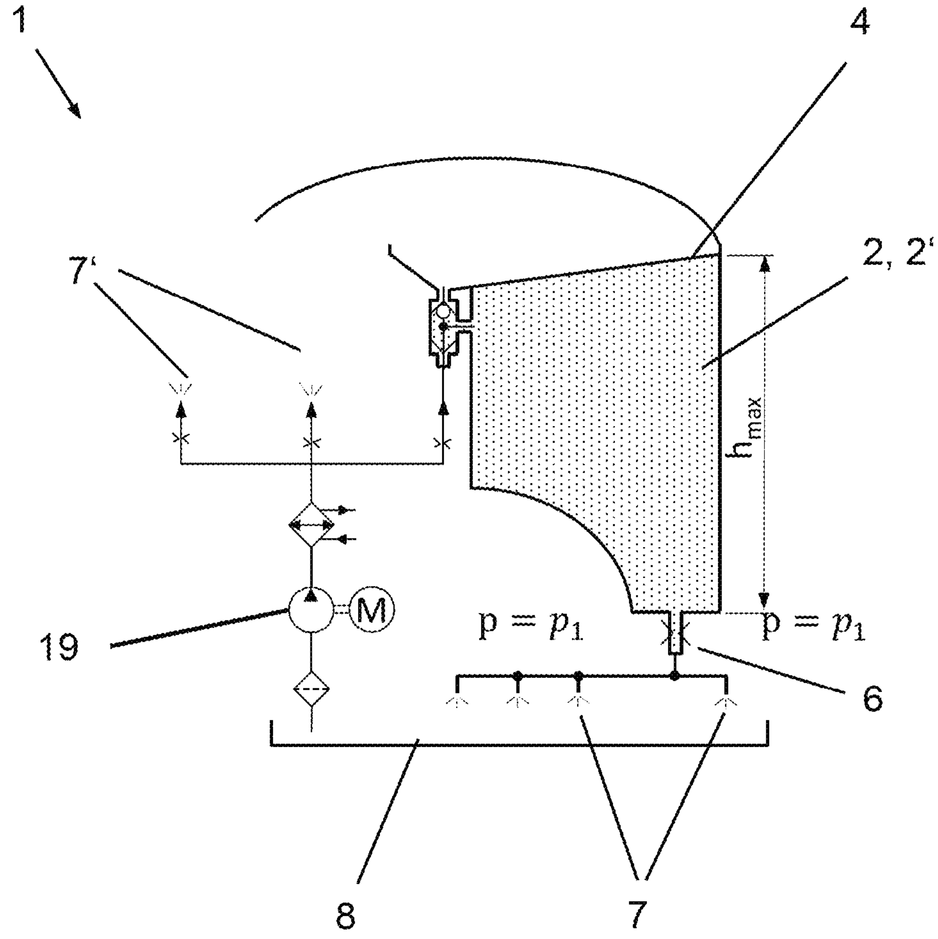
Figure 3:
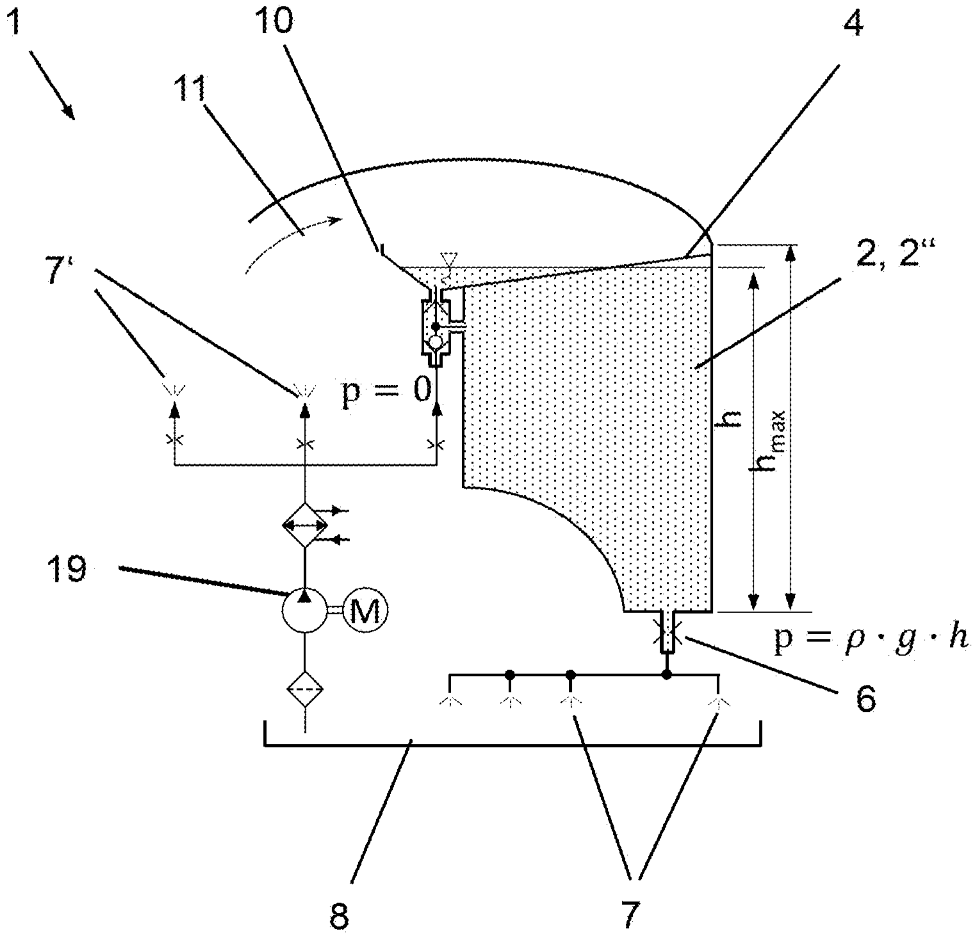
Figure 4:
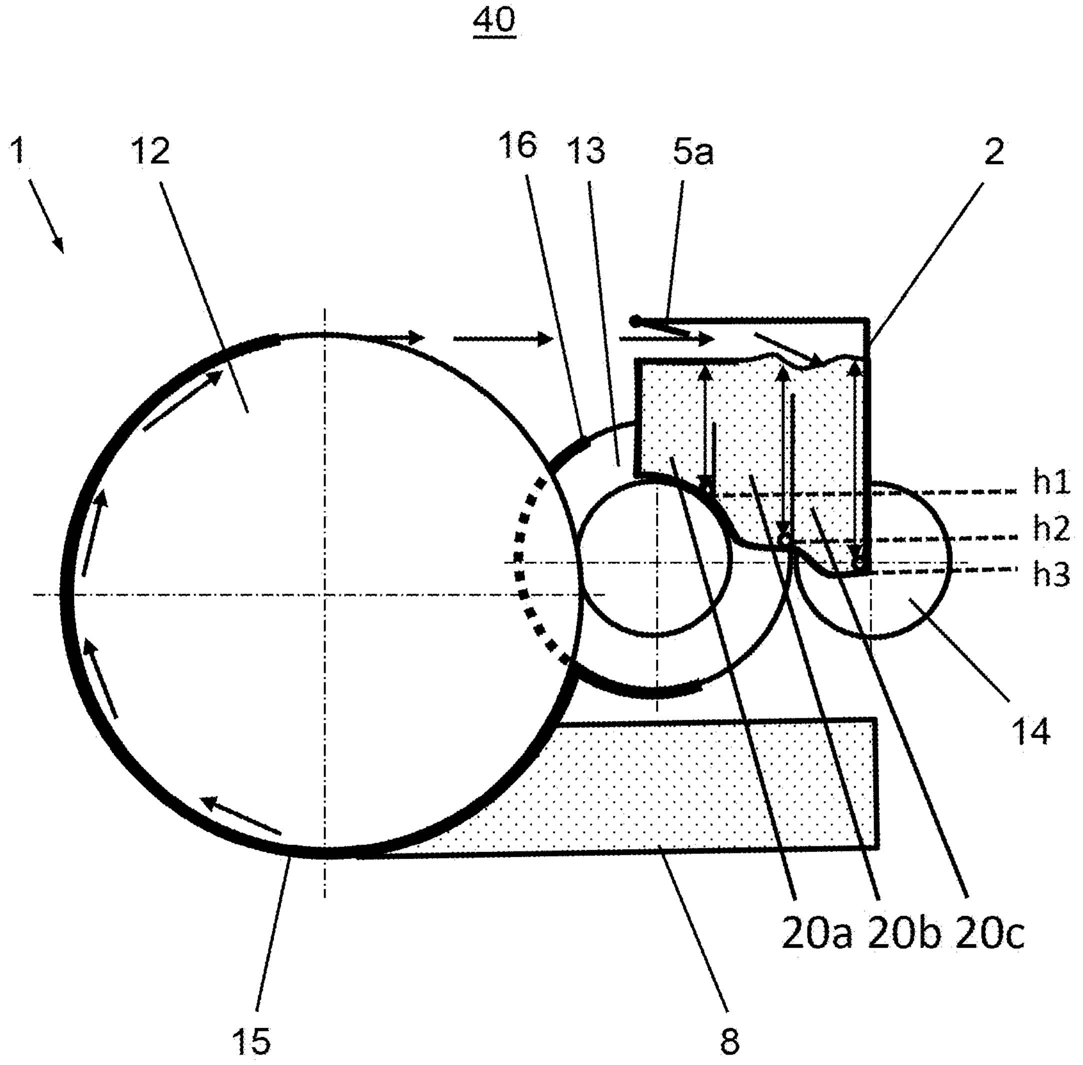
Figure 5:
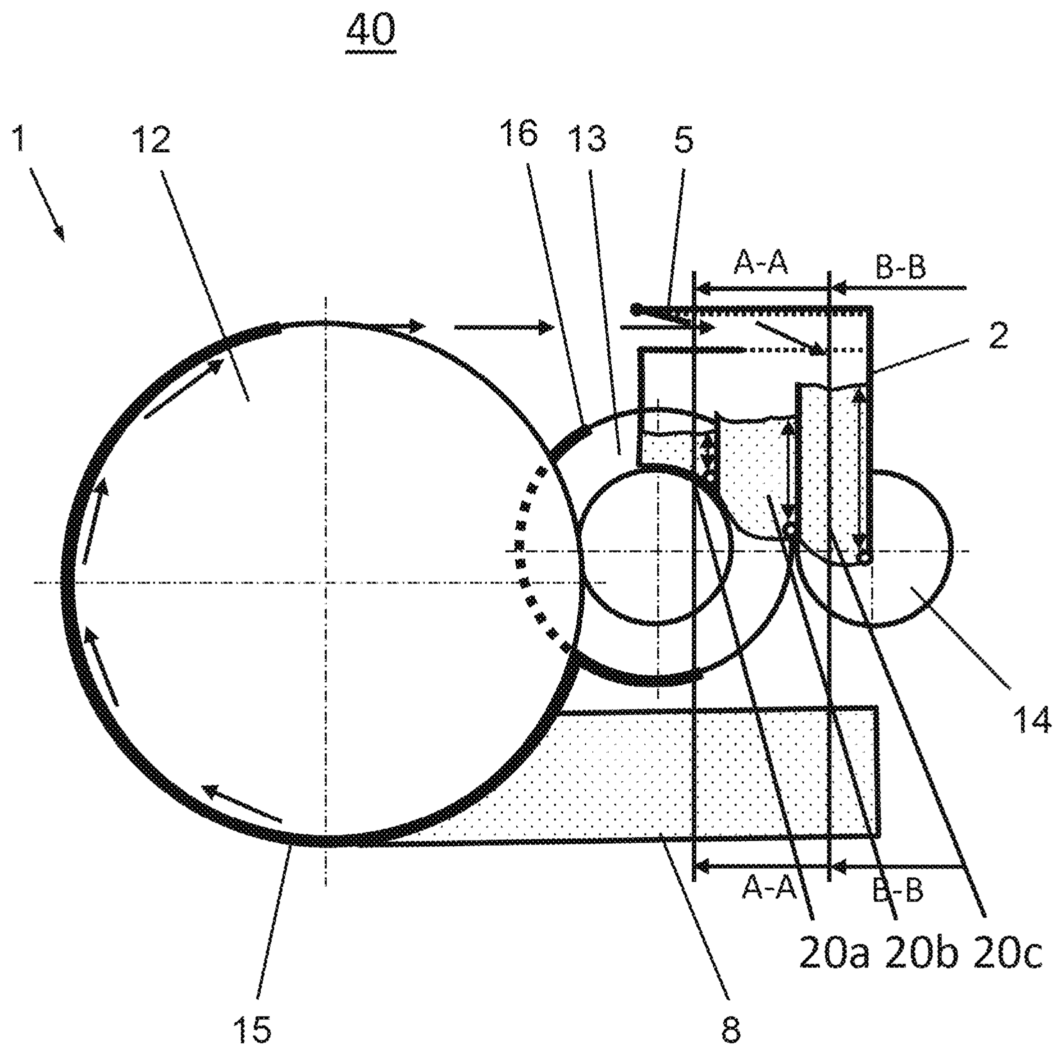
Figure 6:
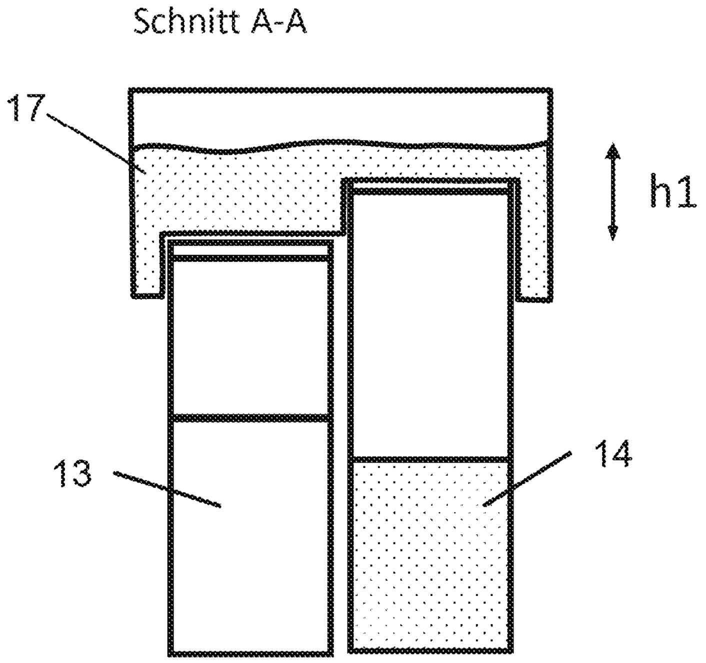
FIG. 6 is a sectional illustration through the chambers of the oil reservoir 2 according to the line A-A in FIG. 5. The low geodetic height h1 is used for lubricating the differential.
Figure 7:
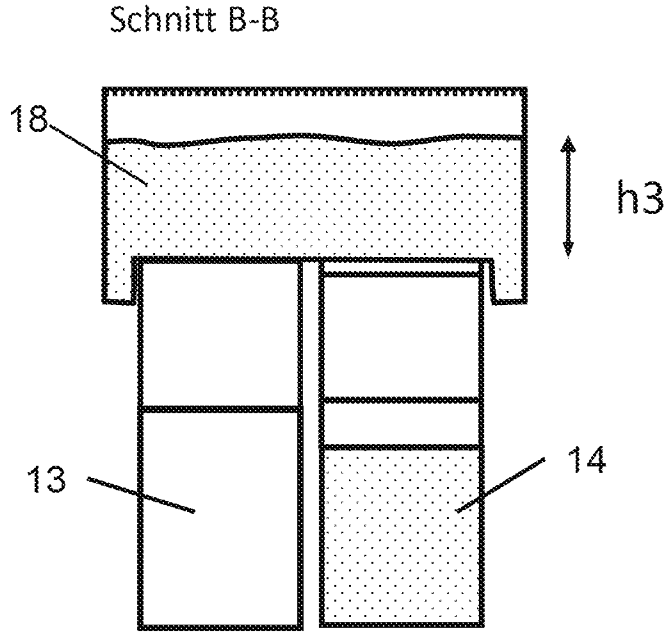
FIG. 7 is a sectional illustration showing the section B-B in FIG. 5. The fill level of the oil has the height h3, and is used for cooling/lubricating the rotor shaft 14.
Figure 8:
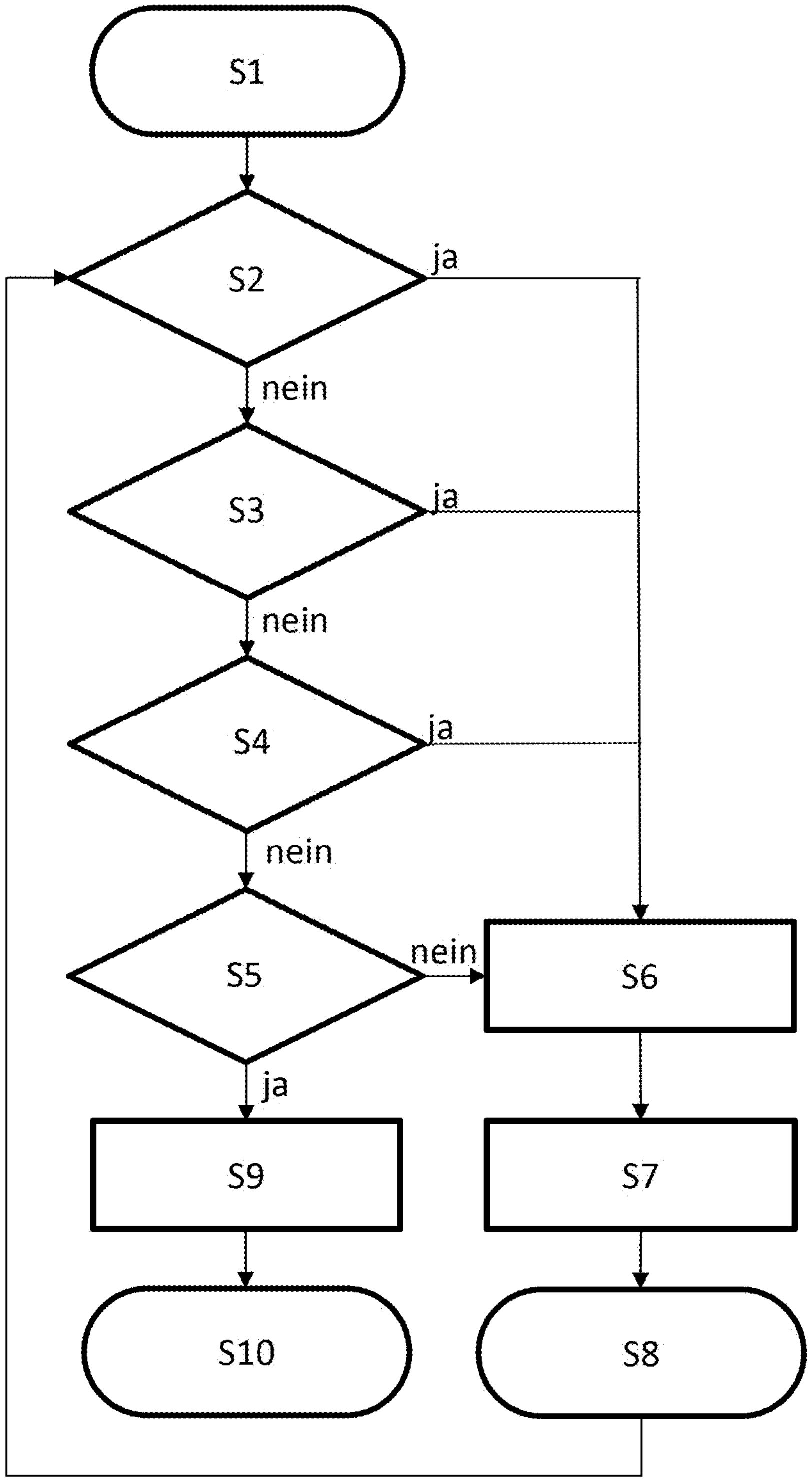

FIG. 8 shows, by way of example, a flow diagram of a possible operating strategy for the operation of the cooling lubricant circuit according to the invention. The step S1 begins with the presence of an electric traction system 40. In step S2, it is queried whether active cooling of the electric machine is required. In step S3, it is queried whether cooling of the transmission is required. In step S4, it is queried whether the transmission requires lubrication. As soon as any one of these queries in steps S2, S3 and S4 is answered "yes", the pump speed of the electric oil pump 19 is calculated in step S6. In step S7, the electric oil pump 19 is activated, and is switched on with the required rotational speed n>0 rpm. As a result, the active cooling and lubrication of the transmission and of the electric machine is activated in S8.

If the queries in steps S2, S3 and S4 arrive at a negative result, then in a step S5, it is determined whether the vehicle speed is sufficient to provide an adequate passive oil flow. For this purpose, it is queried whether $v_{vehicle} \geq v_{lim}$, that is to say whether the vehicle speed is higher than a threshold speed. If the result of this query is positive, then in step S9, the electric oil pump 19 is deactivated, and as a result, in step S10, the transmission and the electric machine are cooled and lubricated passively.

In operating states in which active cooling of the electric machine is advantageous or required for thermal reasons, the active cooling and lubricating circuit is maintained by means of the electrically operated oil pump. A slight preload pressure is set in the oil reservoir 2 in accordance with the oil pump rotational speed and the oil temperature. This leads to advantages with regard to the supply of oil to the transmission components in accordance with demand during longitudinal and transverse acceleration, in particular during sporty dynamic operation of the vehicle, and in the case of different inclinations of the vehicle. Additionally, through the control of the rotational speed of the oil pump, the delivered volume flow can be controlled, and it is thus possible for an increased oil volume flow to be delivered to the individual consumers at operating points where there is an increased demand for cooling/lubricating oil. Furthermore, in this operating state, the entire cooling lubricant flow passes firstly through a heat exchanger that may be provided in the system, and the pressure tank is filled with cooled oil.

The passive cooling/lubricating circuit is automatically activated in operating states in which active operation of the electric oil pump is not required or is not imperatively required for thermal reasons, and in the event of a failure of the electric oil pump. In this case, flow does not pass through a heat exchanger that is provided in the system.

Embodiments without a valve are optionally also possible. During active pump operation, the fluid reservoir is filled by means of the oil pump, but is not actively preloaded.

Different valve designs are possible. For example, the valve may also be formed as a simple hydraulic shuttle valve with a (plastics) valve ball as a sealing element.

A special embodiment uses a flap valve 5*a* as illustrated in FIGS. 9 to 15, and a special shape of the oil reservoir 2.

Figure 9:
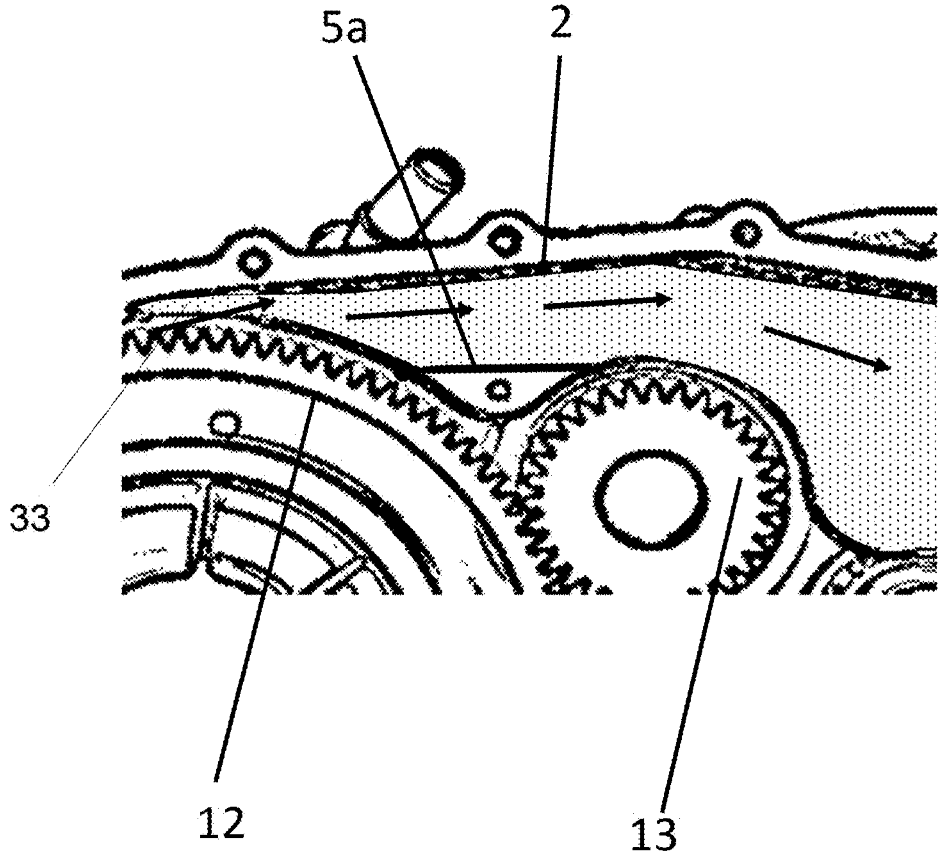

FIG. 9 shows the installation location of the oil reservoir 2 with flap valve above the differential spur gear 12 and above the countershaft gear 13. The opening 33 for the passive filling of the oil reservoir 2 is provided on the left-hand side in FIG. 9. The oil spray enters the oil reservoir 2 here.

Figure 10:
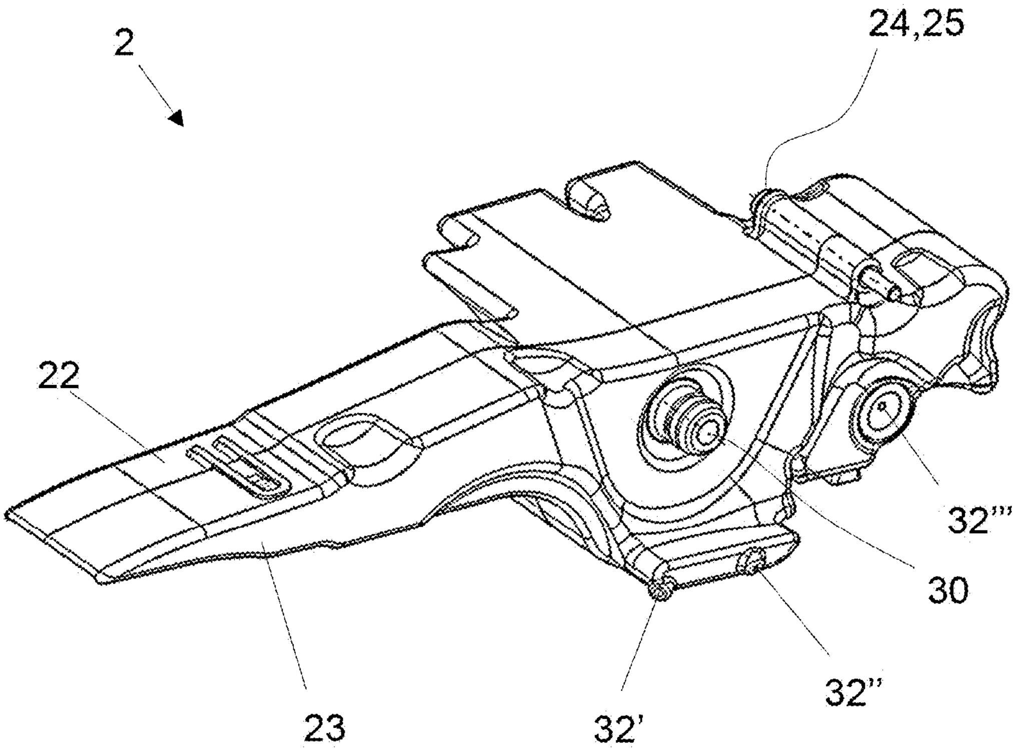

FIG. 10 illustrates the oil reservoir 2 in detail, with a first housing half 22 and with a second housing half 23 connected thereto. A sleeve 24 is formed on the housing halves, which sleeve surrounds a fastening screw 25. The opening 30 for the active filling by means of the oil pump 19 is formed in the central region. Different outlet openings 32', 32" and 32'" serve for different lubrication and cooling tasks.

Figure 11:
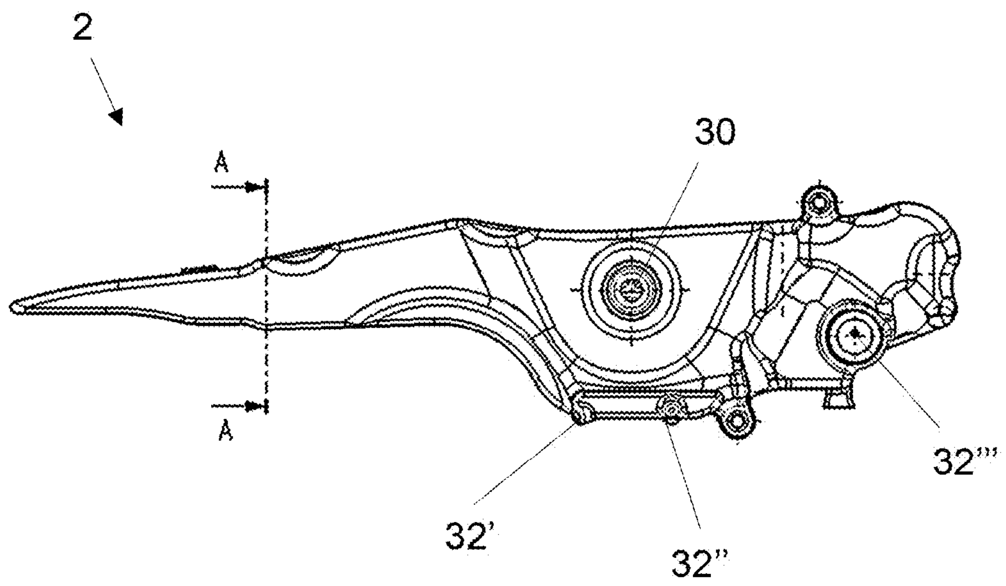
Figure 12:
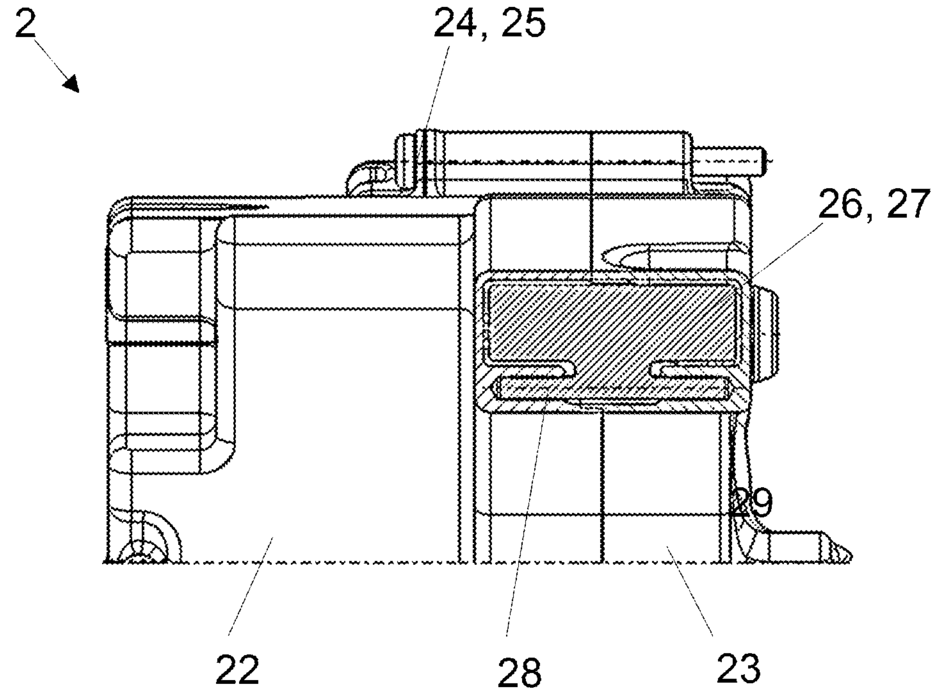
Figure 13:
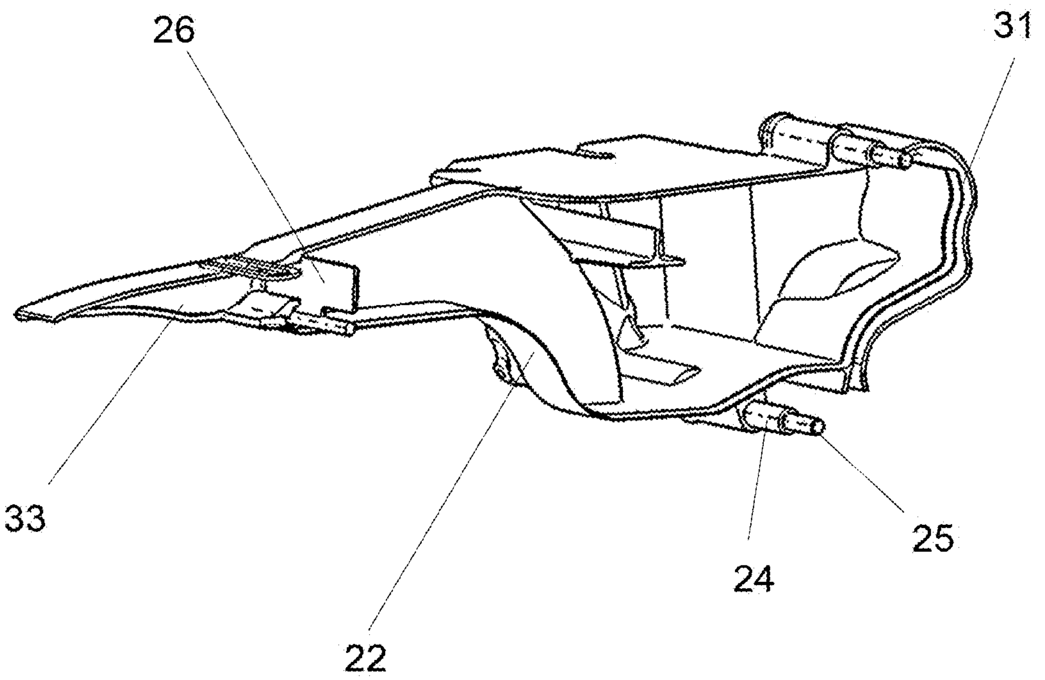
Figure 14:
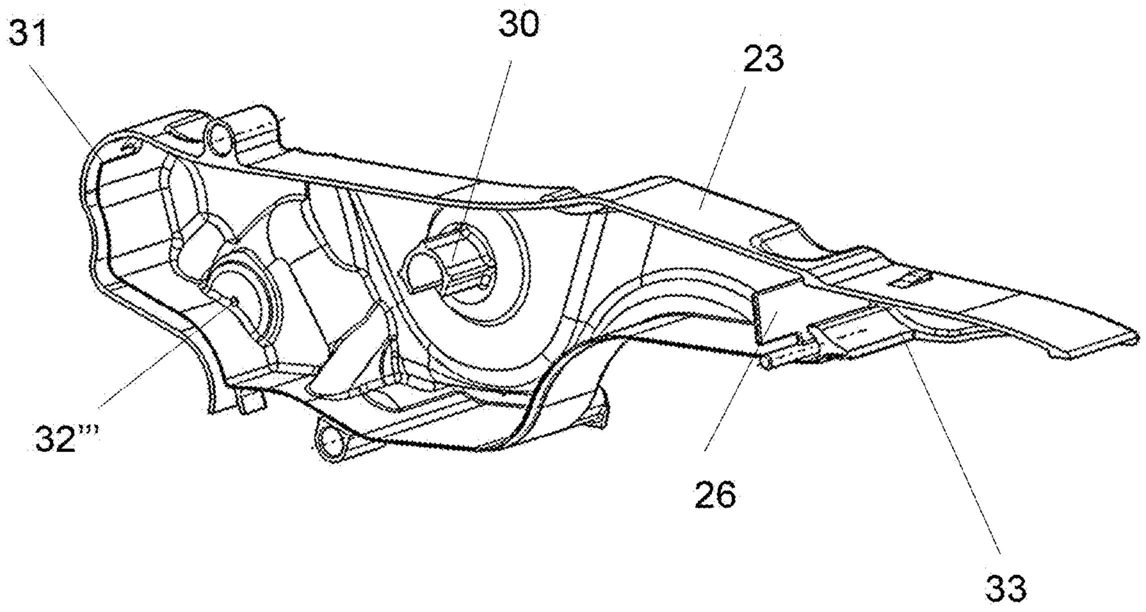

FIG. 12 shows the section A-A from FIG. 11. In addition to the sleeve 24 with the fastening screw 25, it is possible to see a valve flap 26 with its sealing surface 27. The valve flap 26 is seated on a bearing journal 28, which rotates about the axis of rotation 29 of the valve flap 26. The flap valve is a float valve and closes as an oil level in the oil reservoir 2 rises.

Figure 15:
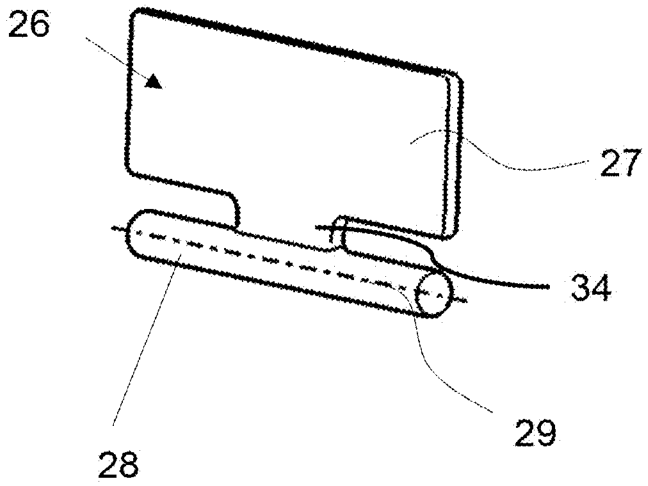

FIG. 15 shows the valve flap 26 in detail. The valve flap 26 is connected via a narrowed portion 34 to the bearing journal 28, which extends outward to both sides of the narrow portion. The component is formed as a single piece.

What is claimed is:

1. An electric traction system having an electric machine, a transmission and a common cooling lubricant circuit, wherein an oil sump and at least one oil reservoir are installed, and the oil reservoir can be filled both by an electric oil pump and by oil spray from components of the transmission, wherein the oil reservoir acts as a pressure tank or high tank, and wherein the oil pump is connected directly to cooling/lubricating oil points under pressure, and the at least one outlet of the oil reservoir is connected to further cooling/lubricating oil points, wherein the further cooling/lubricating oil points are pressurized either also with the pressure of the oil pump or with the geodetic pressure of the oil reservoir, and wherein a single valve is installed at an inlet of the oil reservoir.

2. The electric traction system according to claim 1, wherein the oil reservoir consists of individual chambers that are separated from one another by partitions of different height.

3. The electric traction system according to claim 1, wherein the valve is designed as a 2/2 directional valve and is a hydraulic shuttle valve having a valve ball as a sealing element or is a flap valve.

4. The electric traction system according to claim 3, wherein the flap valve is installed in the oil reservoir, wherein the oil reservoir consists of two housing parts which, when connected together, serve as a bearing for a bearing journal of the valve flap of the flap valve.

5. The electric traction system according to claim 4, wherein the valve flap is formed together with the bearing journal as a single-piece component which has a sealing surface and a connection, via a narrowed portion, to the bearing journal.

6. A method for operating an electric traction system having an electric machine, a transmission and a common cooling lubricant circuit, wherein an oil sump and at least one oil reservoir are installed, and the reservoir can be filled both by an electric oil pump and by oil spray from components of the transmission, wherein the oil reservoir acts as a pressure tank or high tank, wherein the oil pump is connected directly to cooling/lubricating points under pressure, and the at least one outlet of the reservoir is connected to further cooling/lubricating oil points, wherein the further cooling/lubricating oil points are pressurized either also with the pressure of the oil pump or with the geodetic pressure of the reservoir, wherein, in operating states in which active cooling of the electric machine is advantageous or required for thermal reasons, the active cooling and lubricating circuit is maintained by means of the electrically operated oil pump, and in operating states in which active operation of the electric oil pump is not required or is not imperatively required for thermal reasons, and in the event of a failure of the electric oil pump, a passive cooling/lubricating circuit is automatically activated.

7. The method for operating an electric traction system according to claim 6, wherein a slight preload pressure is set in the oil reservoir in accordance with the oil pump rotational speed and the oil temperature.

* * * * *